(12) United States Patent
O'Leary

(10) Patent No.: US 10,458,268 B2
(45) Date of Patent: Oct. 29, 2019

(54) TURBINE SHROUD WITH SEALED BOX SEGMENTS

(71) Applicant: Rolls-Royce North American Technologies, Inc., Indianapolis, IN (US)

(72) Inventor: Mark O'Leary, Zionsville, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 845 days.

(21) Appl. No.: 15/097,343

(22) Filed: Apr. 13, 2016

(65) Prior Publication Data
US 2017/0298753 A1  Oct. 19, 2017

(51) Int. Cl.
| F01D 11/08 | (2006.01) |
| F01D 9/02 | (2006.01) |
| F01D 25/00 | (2006.01) |
| F01D 11/16 | (2006.01) |

(52) U.S. Cl.
CPC .............. *F01D 11/08* (2013.01); *F01D 9/02* (2013.01); *F01D 11/16* (2013.01); *F01D 25/005* (2013.01); *F05D 2220/32* (2013.01); *F05D 2240/11* (2013.01); *F05D 2240/55* (2013.01); *F05D 2240/59* (2013.01); *F05D 2300/6033* (2013.01); *Y02T 50/672* (2013.01)

(58) Field of Classification Search
CPC . F01D 9/02; F01D 9/04; F01D 11/003; F01D 11/005; F01D 11/08; F01D 11/16; F01D 25/005; F01D 25/08; F01D 25/12; F01D 25/14; F01D 25/24; F01D 25/246; F05D 2220/32; F05D 2240/11; F05D 2240/14; F05D 2240/55; F05D 2240/59; F05D 2300/6033
See application file for complete search history.

(56) References Cited

U.S. PATENT DOCUMENTS

| 6,733,235 | B2* | 5/2004 | Alford ................ F01D 11/08 415/173.1 |
| 6,884,026 | B2 | 4/2005 | Glynn et al. |
| 7,033,138 | B2 | 4/2006 | Tomita et al. |
| 7,306,424 | B2 | 12/2007 | Romanov et al. |
| 7,665,957 | B2* | 2/2010 | Khanin ................ F01D 11/005 415/134 |
| 7,726,936 | B2 | 6/2010 | Keller et al. |
| 7,950,234 | B2 | 5/2011 | Radonovich et al. |

(Continued)

OTHER PUBLICATIONS

GE Aviation Jefferies Investor Visit Presentation; May 12, 2014.

*Primary Examiner* — Carlos A Rivera
*Assistant Examiner* — Alexander A White
(74) *Attorney, Agent, or Firm* — Barnes & Thornburg LLP

(57) ABSTRACT

A turbine shroud adapted to extend around a bladed turbine wheel to block gasses from passing over the bladed turbine wheel is disclosed. In a segmented embodiment, each turbine shroud segment may include a carrier segment and a blade track segment. The carrier segment may comprise metallic materials and may be formed to define an attachment-receiving space. The blade track segment may comprise ceramic matrix composite materials and may be formed to include an attachment portion that extends radially outward from the runner into the attachment-receiving space formed by the carrier segment.

8 Claims, 5 Drawing Sheets

(56) References Cited

U.S. PATENT DOCUMENTS

| | | | |
|---|---|---|---|
| 8,069,673 B2* | 12/2011 | Kunitake | F01D 9/023 |
| | | | 60/797 |
| 8,118,546 B2 | 2/2012 | Morrison | |
| 8,128,343 B2 | 3/2012 | Schiavo et al. | |
| 8,246,299 B2 | 8/2012 | Razzell et al. | |
| 8,459,042 B2 | 6/2013 | Lohmueller | |
| 8,534,995 B2 | 9/2013 | McCaffrey | |
| 8,740,552 B2 | 6/2014 | Marusko et al. | |
| 8,753,073 B2 | 6/2014 | Albers et al. | |
| 8,790,067 B2 | 7/2014 | McCaffrey et al. | |
| 8,826,668 B2 | 9/2014 | Lee et al. | |
| 8,834,105 B2* | 9/2014 | Albers | F01D 11/005 |
| | | | 415/173.1 |
| 8,905,709 B2 | 12/2014 | Dziech et al. | |
| 8,926,270 B2 | 1/2015 | Karafillis et al. | |
| 8,932,009 B2 | 1/2015 | Moraines et al. | |
| 8,998,572 B2 | 4/2015 | Lutjen et al. | |
| 2008/0206046 A1 | 8/2008 | Razzell et al. | |
| 2013/0156550 A1 | 6/2013 | Franks et al. | |
| 2014/0023490 A1 | 1/2014 | Hillier | |
| 2014/0255170 A1* | 9/2014 | Hillier | F01D 5/284 |
| | | | 415/174.2 |
| 2016/0102572 A1 | 4/2016 | O'Leary | |
| 2016/0312643 A1* | 10/2016 | Davis | F01D 11/18 |

\* cited by examiner

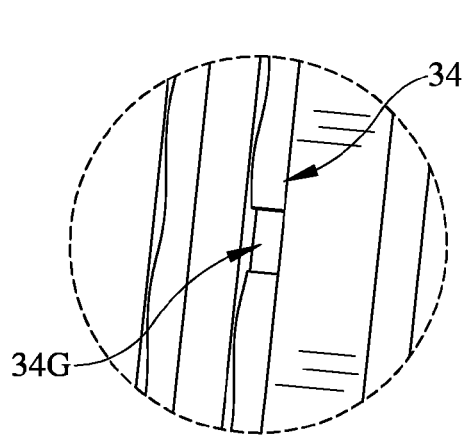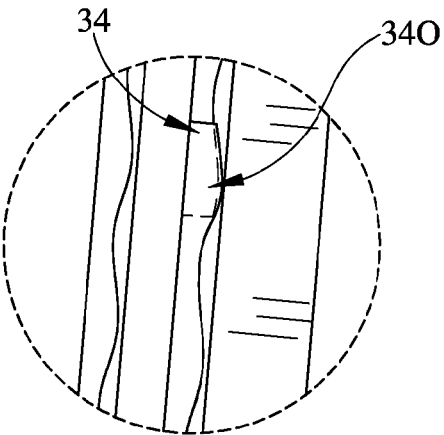
FIG. 8    FIG. 9
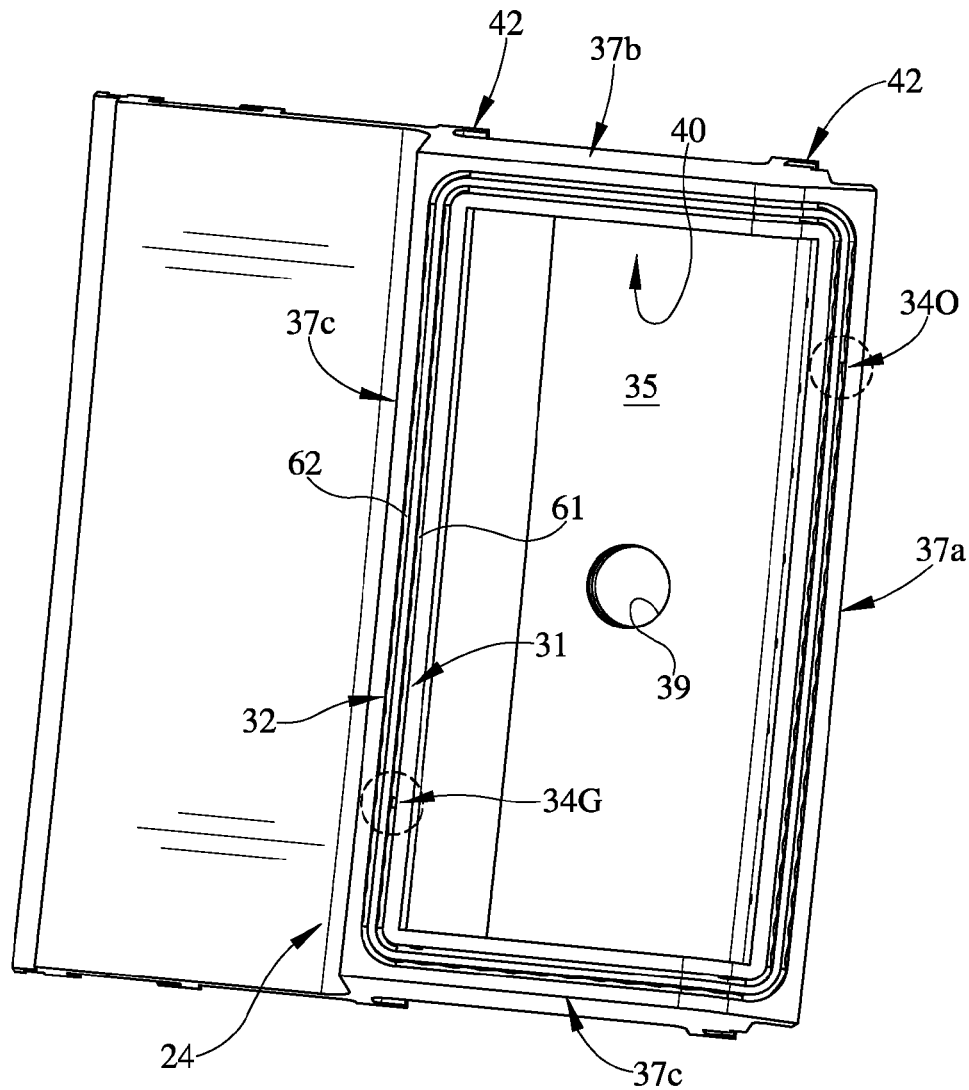
FIG. 7

TURBINE SHROUD WITH SEALED BOX SEGMENTS

FIELD OF THE DISCLOSURE

The present disclosure relates generally to gas turbine engines, and more specifically to turbine shrouds used to seal around turbine wheels in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from ceramic matrix composite materials. Ceramic Matrix Composites (CMCs) sometimes have low allowable stress values compared to metallic alloys. In view of the pressure of the cooling air and the pressure of flowpath gases, seal segments (or blade tracks) in gas turbine engines can experience significant pressure loading. Designing seal segments fabricated from CMC materials with these high pressure loads can be difficult.

SUMMARY

The present disclosure may comprise one or more of the following features and combinations thereof.

According to one aspect of the present disclosure, a turbine shroud segment adapted for use in a gas turbine engine is taught. The turbine shroud segment may include a carrier segment comprising metallic materials and a blade track segment comprising ceramic matrix composite materials. The carrier segment may be formed to define an attachment-receiving space. The blade track segment may be formed to include a runner shaped to extend partway around a central axis and an attachment portion that extends radially outward from the runner into the attachment-receiving space formed by the carrier segment. The turbine shroud segment may include at least one strip seal configured to resist the movement of gasses into the attachment-receiving space.

In illustrative embodiments, the at least one strip seal member may be arranged to extend across a gap formed radially between the carrier segment and the runner into a radially-outwardly opening runner slot formed in a radially-outwardly facing surface of the runner.

In illustrative embodiments, the turbine shroud segment may include at least one spring member corresponding to the at least one strip seal and configured to push a corresponding strip seal toward the central axis. The at least one spring member may be arranged in a radially-inwardly opening carrier slot formed in the carrier segment and a strip seal is at least partially received in the radially-inwardly opening carrier slot.

In illustrative embodiments, a first strip seal may be a one-piece component and may extend at least most of the way around the attachment portion of the blade track segment. The first strip seal may be formed to include a gap as it extends around the attachment portion of the blade track segment sized to accommodate thermal expansion induced during use of the turbine shroud segment. The first strip seal may be sized to form an overlapped portion as it extends around the attachment portion of the blade track segment to accommodate thermal expansion induced during use of the turbine shroud segment.

In illustrative embodiments, the runner of the blade track segment may include a layer of coating that provides at least a portion of the radially-outwardly facing surface of the runner into which the radially-outwardly opening runner slot is formed. The radially-outwardly opening runner slot may extend through the layer of coating and into a ceramic matrix composite portion of the runner. The radially-outwardly opening runner slot may extend into the layer of coating without extending through the layer of coating into other portions of the blade track segment.

In illustrative embodiments, the track-segment coupler assembly may include a retainer plate, a support shaft, an outer spring member, and an inner spring member. The retainer plate may be arranged between the runner of the blade track segment and at least part of the attachment portion of the blade track segment. The support shaft may extend from the carrier segment to the retainer plate. The outer spring member may be arranged radially between the carrier segment and the attachment portion of the blade track segment. The inner spring member may be arranged radially between the retainer plate and at least part of the attachment portion of the blade track segment.

In illustrative embodiments, the attachment portion of the blade track segment may have a U-shaped cross-section. The attachment portion may cooperate with the runner of the blade track segment to define a receiving space in which the retainer plate is received.

According to another aspect of the present disclosure, a turbine shroud segment may include a carrier segment comprising metallic materials and a blade track segment comprising ceramic matrix composite materials. The carrier segment may be formed to define an attachment-receiving space. The blade track segment may be formed to include a runner shaped to extend partway around a central axis and an attachment portion that extends radially outward from the runner into the attachment-receiving space channel formed by the carrier segment. The turbine shroud segment may include a track-segment coupler assembly configured to attach the blade track segment to the carrier segment.

In illustrative embodiments, the track-segment coupler assembly may include a retainer plate, a support shaft, an outer spring member, and an inner spring member. The retainer plate may be arranged between the runner of the blade track segment and at least part of the attachment portion of the blade track segment. The support shaft may extend from the carrier segment to the retainer plate. The outer spring member may be arranged radially between the carrier segment and the attachment portion of the blade track segment. The inner spring member may be arranged radially between the retainer plate and at least part of the attachment portion of the blade track segment.

In illustrative embodiments, the attachment portion of the blade track segment may have a U-shaped cross-section. The attachment portion may cooperate with the runner of the blade track segment to define a receiving space in which the retainer plate is received.

In illustrative embodiments, the support shaft may be formed to include a threaded portion. The threaded portion may be adapted to be engaged during assembly of the turbine shroud segment to apply a predetermined load onto the blade track segment that is distributed along the attachment portion of the blade track segment by the outer spring member and the inner spring member.

In illustrative embodiments, the turbine shroud segment may include a seal member configured to resist the movement of gasses into the attachment-receiving space. The seal member may be arranged to extend across a gap formed radially between the carrier segment and the runner.

In illustrative embodiments, the turbine shroud segment may include a spring member arranged in a radially-inwardly opening carrier slot formed in the carrier segment. The spring member may be configured to push the seal member toward the central axis.

In illustrative embodiments, the runner of the blade track segment may include a layer of coating that provides at least a portion of a radially-outwardly facing surface of the runner into which a radially-outwardly opening runner slot is formed. A portion of the seal member may be received in the radially-outwardly opening runner slot.

According to yet another aspect of the present disclosure, an assembly adapted for use in an engine is disclosed. The assembly may include a first component comprising metallic materials and a second component comprising ceramic matrix composite materials. The first component may be formed to define an attachment-receiving space. The second component may be formed to include a gas path facing portion shaped to extend partway around a central axis and an attachment portion that extends radially outward from the gas path facing portion into the attachment-receiving space channel formed by the first component.

In illustrative embodiments, the assembly may further include at least one strip seal configured to resist the movement of gasses into the attachment-receiving space. The at least one strip seal member may be arranged to extend across a gap formed radially between the first component and the gas path facing portion of the second component into a radially-outwardly opening slot formed in a radially-outwardly facing surface of the gas path facing portion of the second component.

In illustrative embodiments, the assembly may include at least one spring member corresponding to the at least one strip seal arranged in a radially-inwardly opening slot formed in the first component. The at least one spring member may be configured to push a corresponding strip seal toward the central axis.

In illustrative embodiments, the assembly may include a coupler assembly configured to attach the second component to the first component. The coupler assembly may include a retainer plate, a support shaft, an outer spring member, and an inner spring member. The retainer plate may be arranged between the gas path facing portion of the second component and at least part of the attachment portion of the second component. The support shaft may extend from the first component to the retainer plate. The outer spring member may be arranged radially between the first component and the attachment portion of the second component. The inner spring member may be arranged radially between the retainer plate and at least part of the attachment portion of the second component.

These and other features of the present disclosure will become more apparent from the following description of the illustrative embodiments.

BRIEF DESCRIPTION OF THE DRAWINGS

FIG. 7 is a radially-outward looking perspective view of the carrier segment with the wave springs/strip seal members in place within a radially-inwardly opening carrier slot;

FIG. 8 is a detail view of a portion of FIG. 7 showing that a first strip seal member is formed to include a gap sized to accommodate thermal expansion/contraction induced by use of the turbine shroud segment in the gas turbine engine of FIG. 1; and FIG. 9 is another detail view of a portion of FIG. 7 showing that a second strip seal member is formed to include a gap sized to accommodate thermal expansion/contraction induced by use of the turbine shroud segment in the gas turbine engine of FIG. 1.

DETAILED DESCRIPTION OF THE DRAWINGS

Figure 1:
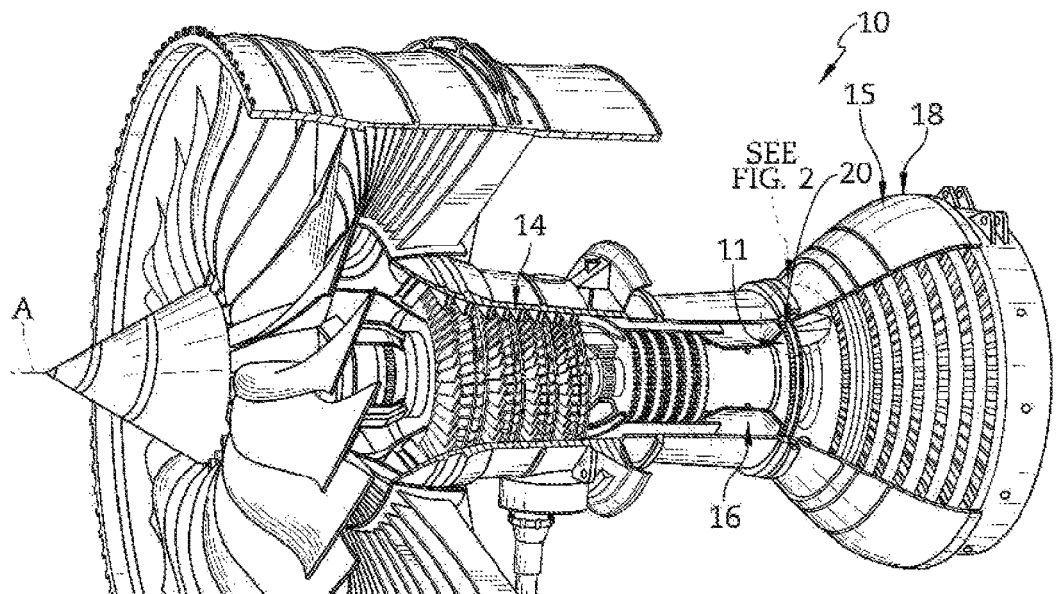
FIG. 1 is a cut-away perspective view of a gas turbine engine showing that the engine includes a fan, a compressor, a combustor, and a turbine, the turbine including a turbine shroud in accordance with the present disclosure positioned radially outward from blades of a turbine wheel assembly as shown in FIG. 2.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling a plane. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
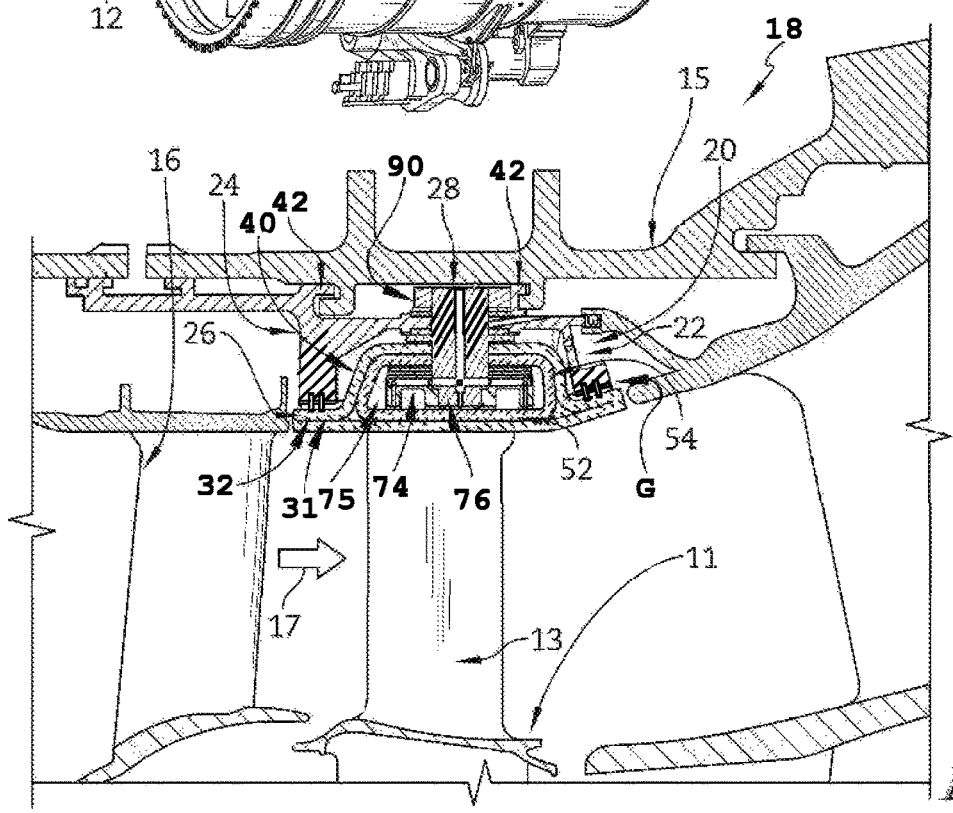
FIG. 2 is a partial sectional view of the gas turbine engine of FIG. 1 showing that the turbine shroud couples with an outer case of the engine to surround the turbine wheel assembly.

The turbine 18 includes at least one turbine wheel assembly 11 and a turbine shroud 20 positioned to surround the turbine wheel assembly 11 as shown in FIG. 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
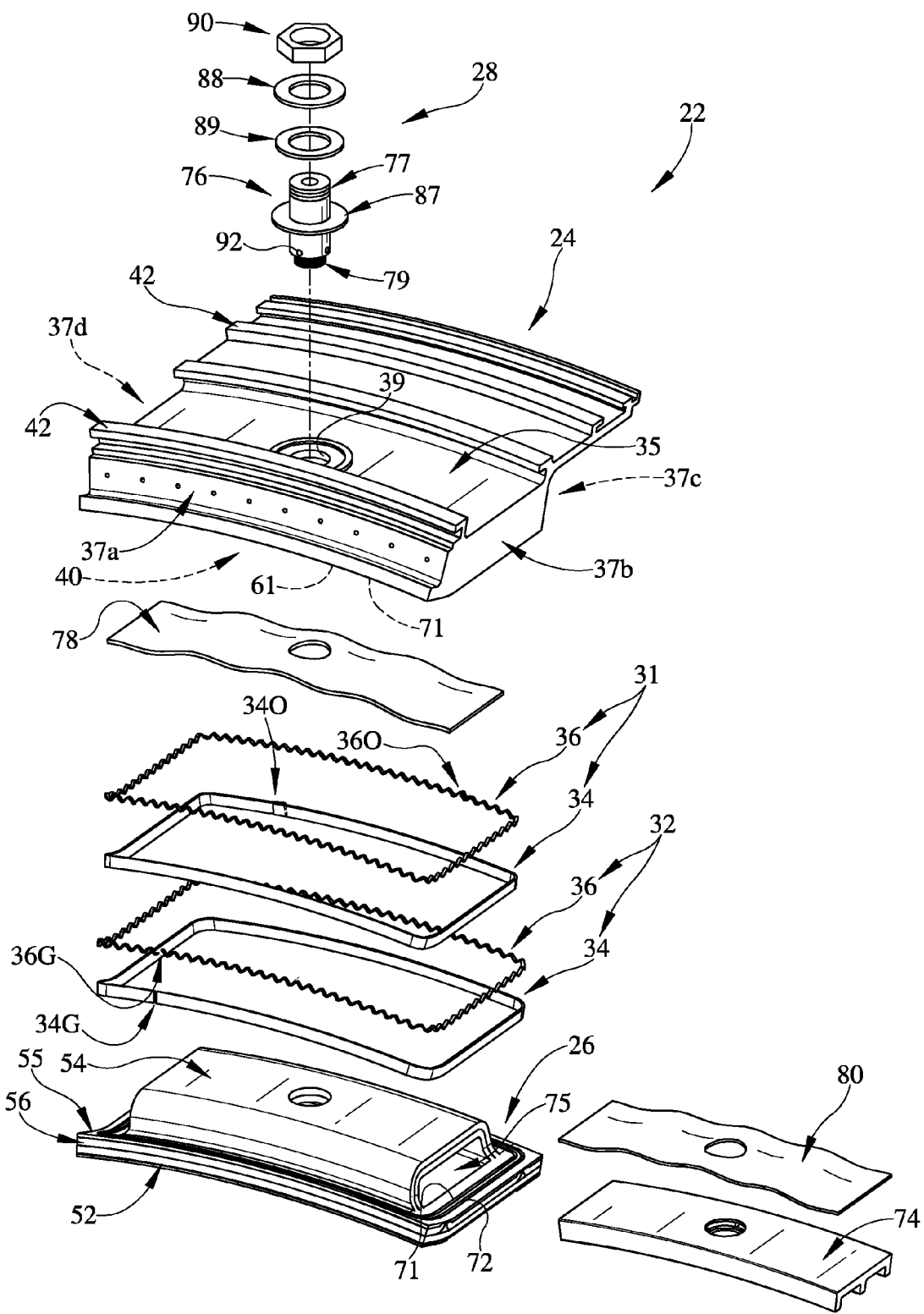
FIG. 3 is an exploded perspective assembly view of one turbine shroud segment included in the turbine shroud of FIG. 2 showing that the turbine shroud segment includes a carrier segment, a blade track segment adapted to be attached to the carrier segment by a track-segment coupler assembly, and a pair of strip seal members adapted to seal between the carrier segment and the blade track segment.
Figure 4:
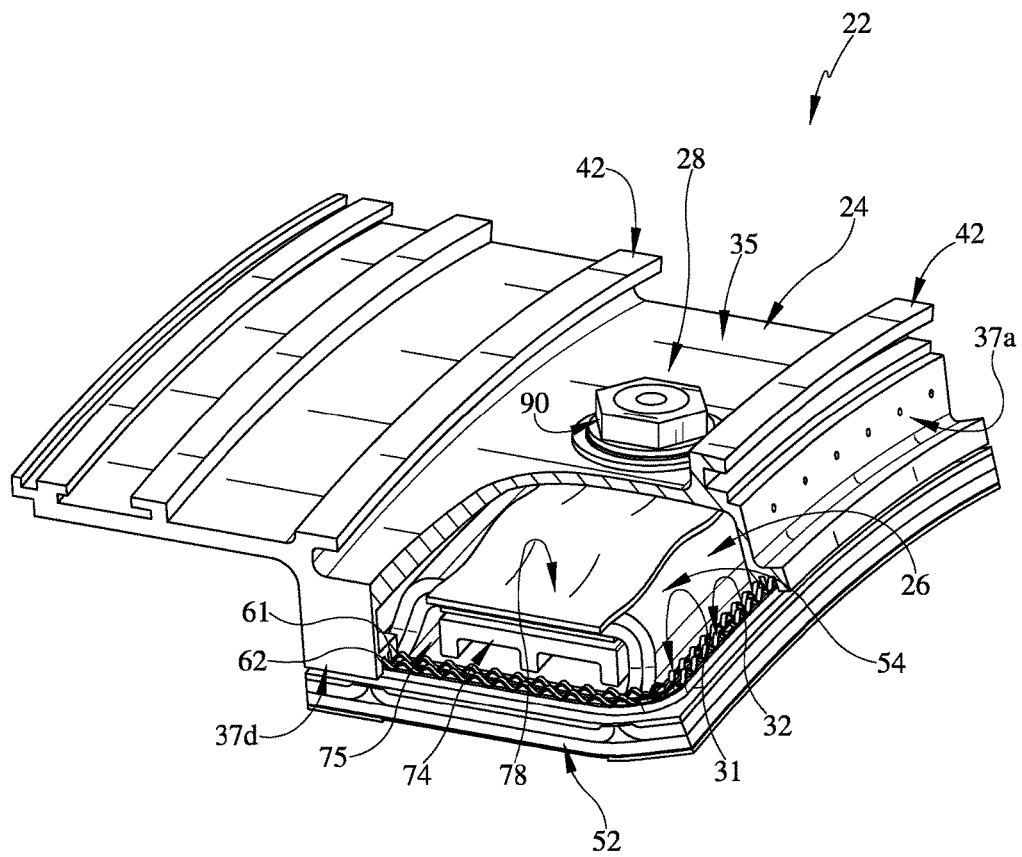
FIG. 4 is a cut-away perspective view of the assembled shroud segment showing that the blade track segment closes a cavity defined by the carrier segment and suggesting that strip seal members seal the cavity.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that extend only part-way around the central axis A and cooperate to surround the turbine wheel assembly 11. In some embodiments, certain components of the turbine shroud 20 are segmented while other components are annular and non-segmented.

Each shroud segment 22 includes a carrier segment 24, a blade track segment 26, and track-segment coupler assembly 28 (sometimes called an attachment assembly) as shown in FIG. 2. The carrier segment 24 is configured to support the blade track segment 26 in position adjacent to the blades 13 of the turbine wheel assembly 11. The blade track segment 26 illustratively comprises ceramic matrix composite materials adapted to withstand the high temperature combustion products along the flow path 17 but that also may have lower strength than metallic materials. The track-segment coupler assembly 28 attaches the blade track segments 26 to corresponding carrier segments 24 locating the blade track segments 26 while distributing loads to accommodate the strength of the blade track segments 26.

Seal assemblies 31, 32 seal between each carrier segment 24 and blade track segment 26 as shown in FIGS. 2-6. Each seal assembly 31, 32 includes a strip seal 34 and a bias member 36. The strip seals 34 block gas from passing through a gap G formed between the carrier segment 24 and the blade track segment 26. Bias members 36 are configured to push the strip seals 34 inward in a radial direction toward the axis A so that the strip seals 34 are properly positioned to block gasses from passing through the gap G.

In the illustrative embodiment, each of the carrier segments 24 is made from metallic materials and includes a body 33 and case hangers 42 coupled to the body 33 as shown in FIGS. 2-4. The body 33 is formed to define a radially-inwardly opening attachment receiving space 40 that receives a portion of a corresponding blade track segment 26. The case hangers 42 are spaced apart from one another and couple the carrier segments 24 to the outer case 15 of the engine 10 as shown in FIG. 2.

The body 33 of each carrier segment includes a mount plate 35 and receiving walls 37a, 37b, 37c, 37d extending radially inward from the mount plate as shown in FIGS. 3 and 4. The mount plate 35 and receiving walls 37a, 37b, 37c, 37d cooperate to define the space 40. The track-segment coupler assembly 28 extends through the mount plate 35 of the body 33 and is configured to hold a blade track segment 26 in spaced apart relation to the mount plate 35 while distributing loads applied to the blade track segment across the mount plate 35.

Each of the blade track segments 26 illustratively includes a runner 52 and an attachment bridge 54 (sometimes called box or attachment portion) extending radially outward from and circumferentially along the runner 52 as shown in FIG. 3. The runner 52 is arcuate and shaped to extend around blades 13 to block gas from passing over the blades 13. The attachment bridge 54 extends outward in the radial direction away from the central axis A from the runner 52 forming a U-shaped cross-sectional shape that cooperates with the runner 52 to define a receiving space 75. In some embodiments, the attachment bridge 54 may be replaced by hangers, dovetails, posts or other suitable attachment structures.

Figure 5:
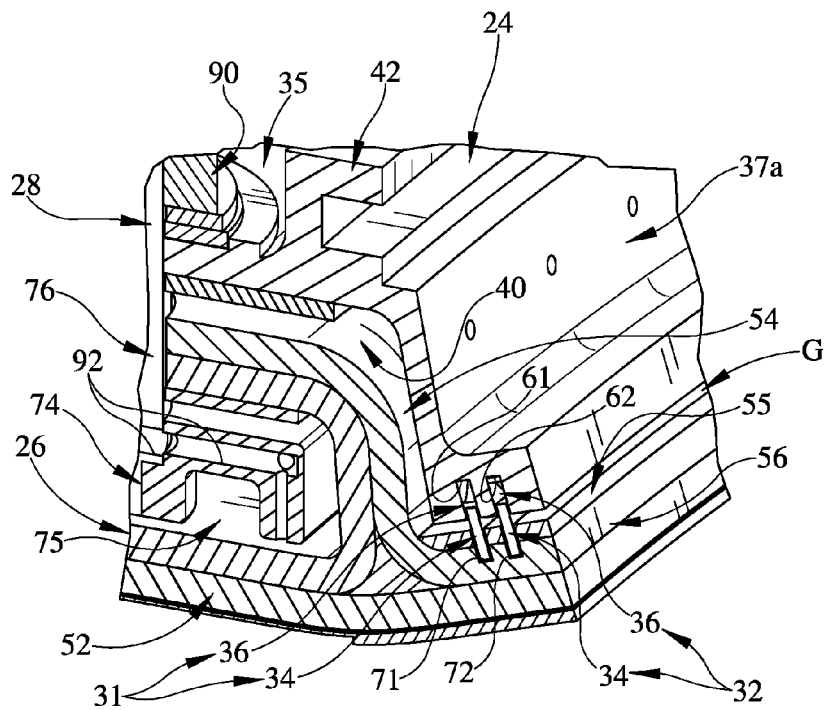
FIG. 5 is a detailed perspective view of a portion of FIG. 4 showing that the strip seal members are received in slots formed by the carrier segment and the blade track segment and showing that wave springs bias the strip steal members toward the blade track segment.
Figure 6:
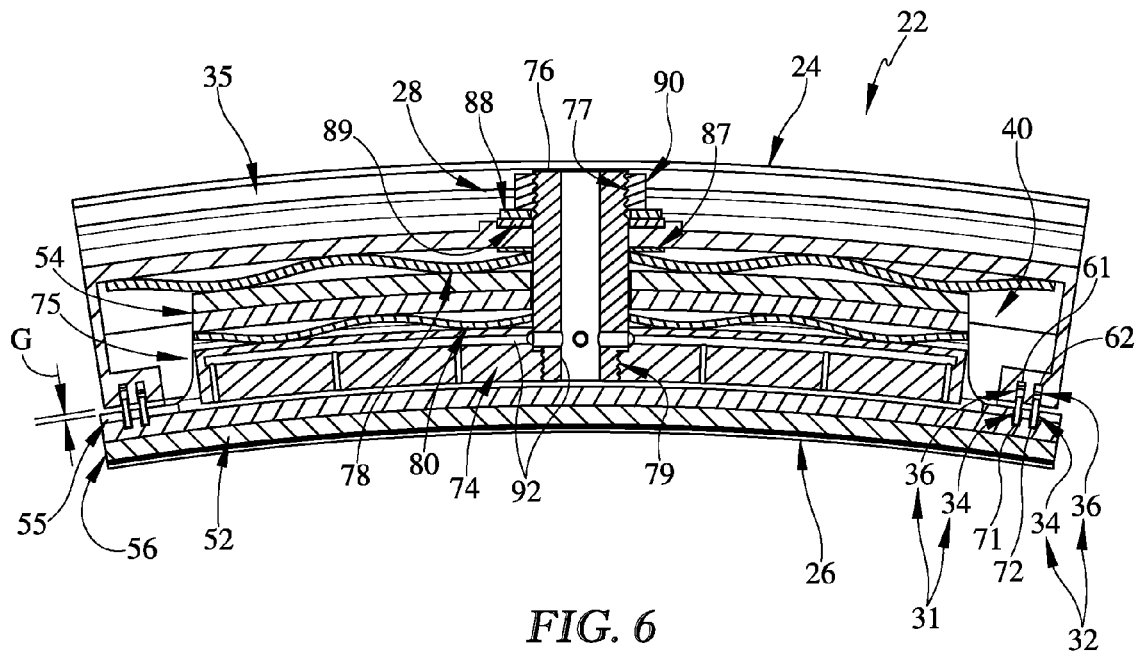
FIG. 6 is a sectional view taken along line 6-6 in FIG. 4 showing that the track-segment coupler assembly includes a support shaft extending through the carrier segment and blade track segment, a retainer plate coupled to the support shaft to hold the blade track segment on the carrier segment, and wave springs arranged above and below an attachment portion of the blade track segment to distribute load applied to the blade track segment by the track-segment coupler assembly.

The seal assemblies 31, 32 are illustratively configured to seal off the space 40 above the runner 52 of the blade track segment 26 as shown in FIGS. 5 and 6. By sealing off the cavity above the runner 52, the pressure loading of the blade track segment 26 can be better controlled and more easily managed to produce stresses in this component that remain below the allowable stress value of the ceramic matrix composite material as well as other relatively low strain-to-failure materials.

Seal assemblies 31, 32 are located by slots 61, 62, 71, 72 formed in the carrier segments 24 and the blade track segments 26. Slots 61, 62 extend radially outwardly and are formed in receiving walls 37a, 37b, 37c, 37d of the body 33 included in a carrier segment 24. Slots 71, 72 extend radially inwardly and are formed in a radially-outwardly facing surface of a runner 52 included in a blade track segment 26. In the illustrative embodiment, slots 71, 72 are illustratively formed in both a layer 55 of Environmental Barrier Coating (EBC) and a ceramic matrix composite material portion 56 of the runner 52. In some embodiments, the slots 71, 72 may extend only into the layer 55 of coating such that a slot is not formed in the ceramic matrix composite portion 56 of the runner 52.

The strip seals 34 of seal assemblies 31, 32 are illustratively made from metallic materials and extend across the gap G to block gasses from passing into the attachment receiving space 40 as shown in FIGS. 5 and 6. Each strip seal 34 is at least partially received in corresponding slots 61, 71 or 62, 72 to locate the strip seals 34. In the illustrative embodiment, the strip seals 34 each extend generally all the way around the track-segment coupler assembly 28 and the attachment bridge 54 as shown in FIG. 3. In other embodiments, a number of discreet strip seals may be arranged at least some portion of the way around the track-segment coupler assembly 28 and the attachment bridge 54.

In the illustrative embodiment, each strip seal 34 is formed to include a gap 34G as it extends around the attachment bridge 54 of a blade track segment 26 as shown in FIG. 8. In other embodiments, the strip seals 34 may be sized to form an overlapped portion 340 as they extend around the attachment bridge 54 of the blade track segment 26 as shown in FIG. 9. The gap 34G, or overlap 340 are sized/configured to accommodate thermal expansion induced during use of the turbine shroud segment 22.

Bias members 36 of seal assemblies 31, 32 are illustratively wave springs made from metallic materials as shown in FIGS. 3 and 4. Each bias member 36 is received in a slot 61, 62 formed in the carrier segment 24 and are configured to push the strip seals 34 radially inwardly toward the runner 52 of the blade track segment 26. In other embodiments, bias members 36 may be provided by leaf springs, coil springs, and/or other suitable biasing devices.

Bias members 36 each extend generally all the way around the track-segment coupler assembly 28 and the attachment bridge 54 as shown in FIG. 3. In some embodiments, a number of discreet bias members may be arranged at least some portion of the way around the track-segment coupler assembly 28 and the attachment bridge 54. In the illustrative embodiment, each bias member 36 is formed to include a gap 36G. In other embodiments, the bias members 36 may be sized to form an overlapped portion 36O. The gap 36G or overlap 36O are sized/configured to accommodate thermal expansion induced during use of the turbine shroud segment 22.

The track-segment coupler assembly 28 is illustratively configured to attach the blade track segment 26 to the carrier segment 24 as shown in FIGS. 2, 3, and 6. The track-segment coupler assembly 28 includes a retainer plate 74, a support shaft 76, an outer spring member 78, and an inner spring member 80 as shown in FIG. 3. The retainer plate 74 is arranged in receiving space 75 of the blade track segment 26 between the runner 52 of the blade track segment 26 and at least part of the attachment bridge 54 of the blade track segment 26. The support shaft 76 extends from the carrier segment 24 to the retainer plate 74. Outer and inner spring members 78, 80 are arranged on opposing sides of the attachment bridge 54 included in the blade track segment 26 in order to distribute loads passed between the carrier segment 24 and the blade track segment 26.

Outer and inner spring members 78, 80 can be configured to distribute the contact load on the CMC seal segment over any number of points. Additionally, the 'stiffness' of the contact being applied to the CMC seal segment can be controlled by varying the stiffness of the bias members 78, 80. By varying the distribution of contact and the stiffness of the bias members 78, 80, the contact stress experienced by the blade track segment 26 can be adjusted to remain below the strength allowable of the CMC material.

Outer and inner spring members 78, 80 are illustratively wave springs, as shown in FIG. 3, but could be leaf springs, coil springs, or other suitable elastic members. Outer spring member 78 is arranged radially between mount plate 35 of the carrier segment 24 and the attachment bridge 54 of the blade track segment 26. Inner spring member 80 arranged radially between the retainer plate 74 and at least part of the attachment bridge 54 of the blade track segment 26.

The support shaft 76 is formed to include threaded portion 77 that engage the retainer plate 74 and a threaded portion 79 that engage a nut 86 outside of the carrier segment 24 as shown in FIG. 3. During assembly of the turbine shroud segment 22 threaded portions 77, 79 are adapted to apply a predetermined load onto the blade track segment 26. The load is distributed along the attachment bridge 54 of the blade track segment 26 by the outer spring member 78 and the inner spring member 80. The support shaft 76 further forms a shoulder 87 that locates the radially outermost position of the blade track segment 26 as suggested in FIG. 6. A washer 88 and gasket 89 may be used to seal an aperture 39 formed in the carrier segment 24 that receives the support shaft 76.

Once the desired preload is achieved using nut 90, the nut 90 can be fixed by a variety of techniques. Examples include but aren't limited to: a separate 'jam' nut, set screw, safety wire, cotter pin, spot weld.

In the illustrative embodiment, the support shaft 76 and the retainer plate 74 are formed to include cooling air passageways 92 as shown in FIG. 6. The cooling air passageways 92 are configured to carry cooling air from radially outward of the shroud segment 22 into contact with the radially outwardly facing surface of the blade track segment 26. Additional description of the cooling air passageways 92 can be found in U.S. patent application Ser. No. 15/004,442 for a TURBINE SHROUD SEGMENT WITH FLANGE-FACING PERIMETER SEAL filed Dec. 29, 2016, which is hereby incorporated by reference in its entirety.

Strip seals 34 of the present disclosure partition off the cavity above the CMC blade track segment (or seal segment), so that a lower pressure can be established above the CMC seal segment, thereby lowering the mechanical pressure loads on the CMC component. This lowers the stress in the CMC component, which is a consideration since CMC material strength is lower than the strength of high temperature metallic alloys.

Strip seals 34 of the present disclosure prevent the ingress of hot flowpath gases into the cavity above the CMC seal segment. This prevents the degradation of the metallic structures supporting and constraining the CMC seal segment.

Strip seals 34 of the present disclosure between the carrier and CMC component allow for significant relative radial separation between these two components, while still providing sealing for the cavity above the CMC seal segment. This can be desirable in the event that the pressure in the cavity above the CMC seal segment, even if briefly, should exceed the pressure of the flowpath. A pressure in the cavity above the CMC seal segment, sufficiently greater than the pressure of the flowpath, could cause the CMC seal segment to separate from the carrier.

In the illustrative embodiment, the radial position of the 'hot face' of the CMC seal segment 26 is controlled by upper and lower springs 78, 80 and the preload introduced in the support shaft 76.

The seal assembly design in the present disclosure lends itself to the relatively easy packaging of multiple loops of strips seals and preload springs. If a single strip seal loop can be configured, it wouldn't take much more space or machining to incorporate additional strip seal loops. Additional strip seal loops can provide (a) improved sealing as more strip seal barriers are introduced in the leak path, and (b) the ability to retain a high degree of sealing should one or more of the strip seal loops fail Springs 36 placed in the strip seal grooves 61, 71 on top of the strip seals 34, encourage desired placement of the strip seals 34 so as to control leakage between the pressure of the flowpath and pressure in the cavity 40 above the CMC seal segment 26.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising
  a carrier segment comprising metallic materials, the carrier segment formed to define an attachment-receiving space,
  a blade track segment comprising ceramic matrix composite materials, the blade track segment formed to include a runner shaped to extend partway around a central axis and an attachment portion that extends radially outward from the runner into the attachment-receiving space formed by the carrier segment, and at least one strip seal configured to resist movement of gases after into the attachment-receiving space, the at least one strip seal arranged to extend across a gap formed radially between the carrier segment and the runner into a radially-outwardly opening runner slot formed in a radially-outwardly facing surface of the runner, wherein a first strip seal is a one-piece component and extends at least most of the way around the attachment portion of the blade track segment, and wherein the first strip seal is formed to include a gap as it extends around the attachment portion of the blade track segment sized to accommodate thermal expansion induced during use of the turbine shroud segment.

2. A turbine shroud segment adapted for use in a gas turbine engine, the turbine shroud segment comprising a carrier segment comprising metallic materials, the carrier segment formed to define an attachment-receiving space, a blade track segment comprising ceramic matrix composite materials, the blade track segment formed to include a runner shaped to extend partway around a central axis and an attachment portion that extends radially outward from the runner into the attachment-receiving space formed by the carrier segment, and at least one strip seal configured to resist movement of gases after into the attachment-receiving space, the at least one strip seal arranged to extend across a gap formed radially between the carrier segment and the runner into a radially-outwardly opening runner slot formed in a radially-outwardly facing surface of the runner, wherein a first strip seal is a one-piece component and extends at least most of the way around the attachment portion of the blade track segment, and wherein the first strip seal is sized to form an overlapped portion as it extends around the attachment portion of the blade track segment to accommodate thermal expansion induced during use of the turbine shroud segment.

3. A turbine shroud segment adapted for use in a gas turbine engine, the turbine shroud segment comprising a carrier segment comprising metallic materials, the carrier segment formed to define an attachment-receiving space, a blade track segment comprising ceramic matrix composite materials, the blade track segment formed to include a runner shaped to extend partway around a central axis and an attachment portion that extends radially outward from the runner into the attachment-receiving space formed by the carrier segment, and at least one strip seal configured to resist movement of gases after into the attachment-receiving space, the at least one strip seal arranged to extend across a gap formed radially between the carrier segment and the runner into a radially-outwardly opening runner slot formed in a radially-outwardly facing surface of the runner, wherein the runner of the blade track segment includes a layer of coating that provides at least a portion of the radially-outwardly facing surface of the runner into which the radially-outwardly opening runner slot is formed, and wherein the radially-outwardly opening runner slot extends through the layer of coating and into a ceramic matrix composite portion of the runner.

4. A turbine shroud segment adapted for use in a gas turbine engine, the turbine shroud segment comprising a carrier segment comprising metallic materials, the carrier segment formed to define an attachment-receiving space, a blade track segment comprising ceramic matrix composite materials, the blade track segment formed to include a runner shaped to extend partway around a central axis and an attachment portion that extends radially outward from the runner into the attachment-receiving space formed by the carrier segment, at least one strip seal configured to resist movement of gases after into the attachment-receiving space, the at least one strip seal arranged to extend across a gap formed radially between the carrier segment and the runner into a radially-outwardly opening runner slot formed in a radially-outwardly facing surface of the runner, and a track-segment coupler assembly configured to attach the blade track segment to the carrier segment, wherein the track-segment coupler assembly includes a retainer plate arranged between the runner of the blade track segment and at least part of the attachment portion of the blade track segment, a support shaft that extends from the carrier segment to the retainer plate, an outer spring member arranged radially between the carrier segment and the attachment portion of the blade track segment, and an inner spring member arranged radially between the retainer plate and at least part of the attachment portion of the blade track segment.

5. The turbine shroud assembly of claim 4, wherein the attachment portion of the blade track segment has a U-shaped cross-section and cooperates with the runner of the blade track segment to define a receiving space in which the retainer plate is received.

6. A turbine shroud segment comprising a carrier segment comprising metallic materials, the carrier segment formed to define an attachment-receiving space, a blade track segment comprising ceramic matrix composite materials, the blade track segment formed to include a runner shaped to extend partway around a central axis and an attachment portion that extends radially outward from the runner into the attachment-receiving space formed by the carrier segment, a track-segment coupler assembly configured to attach the blade track segment to the carrier segment, wherein the track-segment coupler assembly includes a retainer plate arranged between the runner of the blade track segment and at least part of the attachment portion of the blade track segment, a support shaft that extends from the carrier segment to the retainer plate, an outer spring member arranged radially between the carrier segment and the attachment portion of the blade track segment, and an inner spring member arranged radially between the retainer plate and at least part of the attachment portion of the blade track segment, a seal member configured to resist movement of gases after into the attachment-receiving space, the seal member arranged to extend across a gap formed radially between the carrier segment and the runner, and a spring member arranged in a radially-inwardly opening carrier slot formed in the carrier segment and configured to push the seal member toward the central axis.

7. A turbine shroud segment comprising
a carrier segment comprising metallic materials, the carrier segment formed to define an attachment-receiving space,
a blade track segment comprising ceramic matrix composite materials, the blade track segment formed to include a runner shaped to extend partway around a central axis and an attachment portion that extends radially outward from the runner into the attachment-receiving space formed by the carrier segment, and
a track-segment coupler assembly configured to attach the blade track segment to the carrier segment, wherein the track-segment coupler assembly includes a retainer plate arranged between the runner of the blade track segment and at least part of the attachment portion of the blade track segment, a support shaft that extends from the carrier segment to the retainer plate, an outer spring member arranged radially between the carrier segment and the attachment portion of the blade track segment, and an inner spring member arranged radially between the retainer plate and at least part of the attachment portion of the blade track segment,
wherein the runner of the blade track segment includes a layer of coating that provides at least a portion of a radially-outwardly facing surface of the runner into which a radially-outwardly opening runner slot is formed and a portion of the seal member is received in the radially-outwardly opening runner slot.

8. An assembly adapted for use in an engine, the assembly comprising
a first component comprising metallic materials, the first component formed to define an attachment-receiving space,
a second component comprising ceramic matrix composite materials, the second component formed to include a gas path facing portion shaped to extend partway around a central axis and an attachment portion that extends radially outward from the gas path facing portion into the attachment-receiving space formed by the first component,
at least one strip seal configured to resist movement of gases after into the attachment-receiving space, the at least one strip seal arranged to extend across a gap formed radially between the first component and the gas path facing portion of the second component into a radially-outwardly opening slot formed in a radially-outwardly facing surface of the gas path facing portion of the second component, and
a coupler assembly configured to attach the second component to the first component, wherein the coupler assembly includes a retainer plate arranged between the gas path facing portion of the second component and at least part of the attachment portion of the second component, a support shaft that extends from the first component to the retainer plate, an outer spring member arranged radially between the first component and the attachment portion of the second component, and an inner spring member arranged radially between the retainer plate and at least part of the attachment portion of the second component.

* * * * *